United States Patent
Abeysooriya et al.

(10) Patent No.: US 9,336,483 B1
(45) Date of Patent: May 10, 2016

(54) DYNAMICALLY UPDATED NEURAL NETWORK STRUCTURES FOR CONTENT DISTRIBUTION NETWORKS

(71) Applicant: Pearson Education, Inc., Upper Saddle River, NJ (US)

(72) Inventors: Thilani Abeysooriya, Matale (LK); Bhanuka Withana, Colombo (LK); Achila Liyanarachchi, Colombo (LK); Thimira Dilina Kalindu Amaratunga, Nugegoda (LK)

(73) Assignee: PEARSON EDUCATION, INC., Upper Saddle River, NJ (US)

( * ) Notice: Subject to any disclaimer, the term of this patent is extended or adjusted under 35 U.S.C. 154(b) by 0 days.

(21) Appl. No.: 14/678,312

(22) Filed: Apr. 3, 2015

(51) Int. Cl.
   *G06N 3/08* (2006.01)
(52) U.S. Cl.
   CPC .......................................... *G06N 3/08* (2013.01)
(58) Field of Classification Search
   None
   See application file for complete search history.

(56) References Cited

U.S. PATENT DOCUMENTS

| | | | | |
|---|---|---|---|---|
| 2003/0190603 A1* | 10/2003 | Larder | .................... | G06F 19/18 435/5 |
| 2007/0011114 A1* | 1/2007 | Chen | ....................... | G06N 3/086 706/15 |
| 2007/0150424 A1* | 6/2007 | Igelnik | .................. | G05B 17/02 706/15 |

OTHER PUBLICATIONS

Wang, Haixun, et al. "Mining concept-drifting data streams using ensemble classifiers." Proceedings of the ninth ACM SIGKDD international conference on Knowledge discovery and data mining. ACM, 2003.*

Arifovic, Jasmina, and Ramazan Gencay. "Using genetic algorithms to select architecture of a feedforward artificial neural network." Physica A: Statistical mechanics and its applications 289.3 (2001): 574-594.*

Ma, Liying, and Khashayar Khorasani. "A new strategy for adaptively constructing multilayer feedforward neural networks." Neurocomputing 51 (2003): 361-385.*

Nishida, K. Y. O. S. U. K. E., and Koichiro Yamauchi. "Adaptive classifiers-ensemble system for tracking concept drift." Machine Learning and Cybernetics, 2007 International Conference on. vol. 6. IEEE, 2007.*

(Continued)

*Primary Examiner* — Kakali Chaki
*Assistant Examiner* — Daniel Pellett
(74) *Attorney, Agent, or Firm* — Kilpatrick Townsend & Stockton LLP

(57) ABSTRACT

Dynamically updating neural network systems may be implemented to generate, train, evaluate and update artificial neural network data structures used by content distribution networks. Such systems and methods described herein may include generating and training neural networks, using neural networks to perform predictive analysis and other decision-making processes within content distribution networks, evaluating the performance of neural networks, and generating and training pluralities of replacement candidate neural networks within cloud computing architectures and/or other computing environments.

17 Claims, 10 Drawing Sheets

(56) References Cited

OTHER PUBLICATIONS

Biehl, M., and H. Schwarze. "Learning drifting concepts with neural networks." Journal of Physics A: Mathematical and General 26.11 (1993): 2651.*

Elwell, Ryan, and Robi Polikar. "Incremental learning of concept drift in nonstationary environments." Neural Networks, IEEE Transactions on 22.10 (2011): 1517-1531.*

Khashei, Mehdi, and Mehdi Bijari. "An artificial neural network (p, d, q) model for timeseries forecasting." Expert Systems with applications 37.1 (2010): 479-489.*

Kolter, J. Zico, and Marcus A. Maloof. "Dynamic weighted majority: An ensemble method for drifting concepts." The Journal of Machine Learning Research 8 (2007): 2755-2790.*

Kolter, Jeremy Z., and Marcus Maloof. "Dynamic weighted majority: A new ensemble method for tracking concept drift." Data Mining, 2003. ICDM 2003. Third IEEE International Conference on. IEEE, 2003.*

Minku, Leandro L., and Xin Yao. "DDD: A new ensemble approach for dealing with concept drift." Knowledge and Data Engineering, IEEE Transactions on 24.4 (2012): 619-633.*

Nishida, Kyosuke, Koichiro Yamauchi, and Takashi Omori. "Ace: Adaptive classifiers-ensemble system for concept-drifting environments." Multiple Classifier Systems. Springer Berlin Heidelberg, 2005. 176-185.*

Scholz, Martin, and Ralf Klinkenberg. "An ensemble classifier for drifting concepts." Proceedings of the Second International Workshop on Knowledge Discovery in Data Streams. Porto, Portugal, 2005.*

Street, W. Nick, and YongSeog Kim. "A streaming ensemble algorithm (SEA) for large-scale classification." Proceedings of the seventh ACM SIGKDD international conference on Knowledge discovery and data mining. ACM, 2001.*

Zhou, Zhi-Hua, Jianxin Wu, and Wei Tang. "Ensembling neural networks: many could be better than all." Artificial intelligence 137.1 (2002): 239-263.*

\* cited by examiner

DYNAMICALLY UPDATED NEURAL NETWORK STRUCTURES FOR CONTENT DISTRIBUTION NETWORKS

BACKGROUND

Artificial neural networks may be designed, constructed, and trained to perform a wide range of decision-making processes and predictive analyses. Such neural networks may be implemented as data structures including a plurality of nodes (or neurons) along with a defined set of interconnections between pairs of nodes, and a weight value associated with each interconnection. Such neural networks may be structured in layers, for example, a first layer of input nodes, one or more layers of internal nodes, and a layer of output nodes. After a neural network data structure has been generated and trained with an appropriate training data set, it may be used to perform decision-making processes and predictive analyses for various systems. For instance, a trained neural network may be deployed within a content distribution network and used perform tasks such as detecting patterns, predicting user behavior, data processing, function approximation, and the like.

Unfortunately, the performance of certain neural networks may tend to decrease over time. Such performance degradation may result in less accuracy of the predictions and other outputs generated by the neural network. After a neural network data structure has been generated, trained, and deployed, there may be little or no flexibility in altering the operation of the deployed neural network. In some cases, it may be possible to replace a neural network, but the time and resources required to generate and train replacement neural networks may be significant.

BRIEF SUMMARY

Various embodiments described herein may relate to systems and methods for dynamically evaluating and updating artificial neural network data structures used by content distribution networks. Techniques disclosed herein may include systems and methods for generating and training neural networks to be deployed for use by content distribution networks, using neural networks within content distribution networks to perform predictive analyses and other decision-making processes, and evaluating and replacing the neural networks used within content distribution networks.

In some embodiments, neural network training data may be stored in and retrieved from a training database, training batch files, or other computer storage, and used to perform an initial training process for a neural network data structure. After the neural network is deployed and used by a content distribution network, additional input and output data associated with the content distribution network may be received and used to continuously or periodically evaluate the performance level of the neural network. Based on such evaluations, a plurality of additional neural network data structures may be generated and trained as replacement candidates for the deployed neural network. In some embodiments, genetic mutation algorithms and/or randomization algorithms may be used to determine the structure and initial configuration of the replacement candidate neural networks. Additionally, in some embodiments, computing resources may be allocated from within a cloud computing architecture to generate and train the potential replacement neural networks. After the replacement candidate neural networks have been generated and trained, each replacement candidate may be evaluated and a replacement neural network may be selected and deployed for use by the content distribution network.

In the appended figures, similar components and/or features may have the same reference label. Further, various compo of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
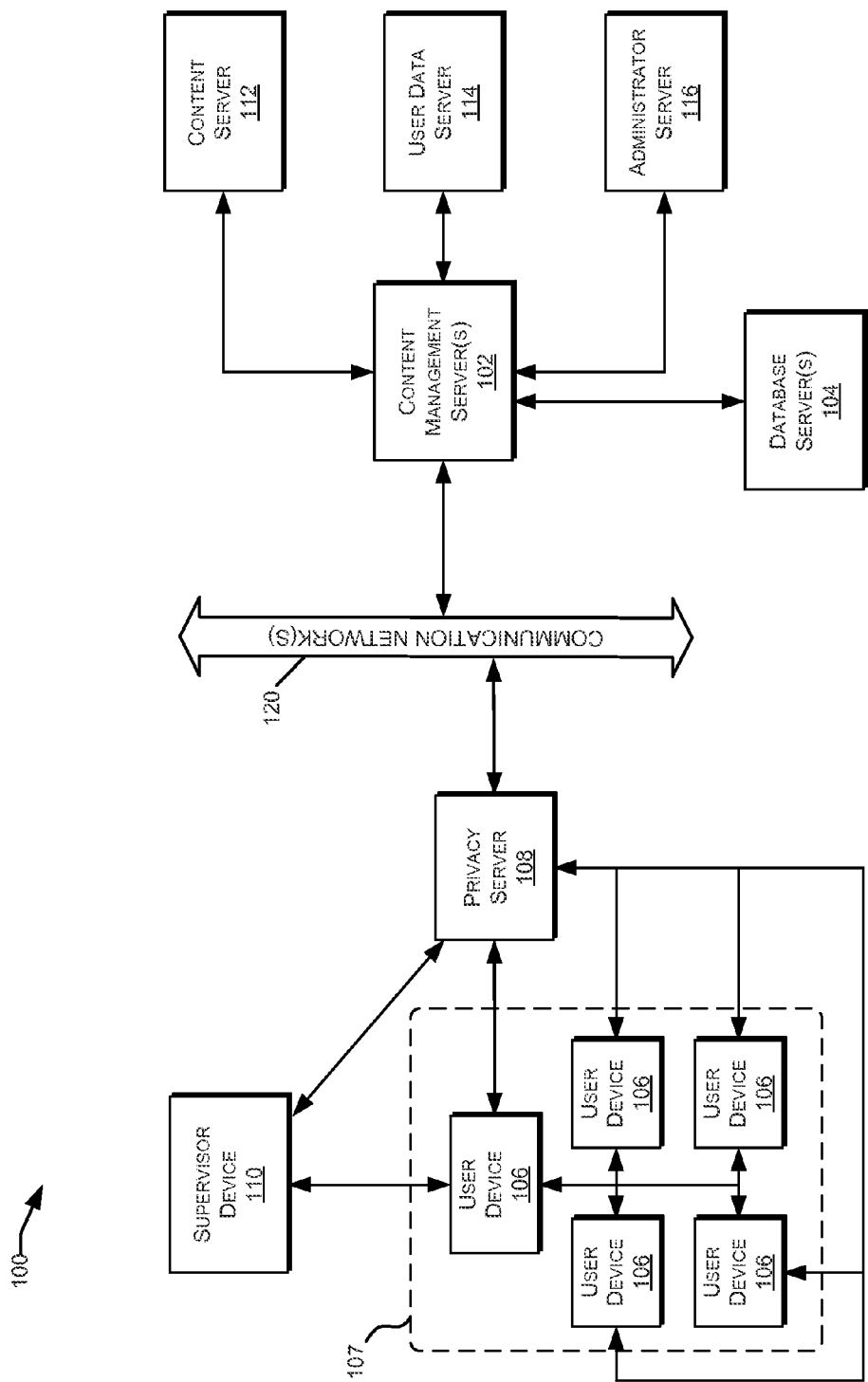
FIG. 1 is a block diagram showing illustrating an example of a content distribution network.

With reference now to FIG. 1, a block diagram is shown illustrating various components of a content distribution network (CDN) 100 which implements and supports certain embodiments and features described herein. Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more databases servers 104, also referred to herein as databases. Databases 104 may comprise stored data relevant to the functions of the content distribution network 100. Illustrative examples of databases 104 that may be maintained in certain embodiments of the content distribution network 100 are described below in reference to FIG. 3. In some embodiments, multiple databases may reside on a single database server 104, either using the same storage components of server 104 or using different physical storage components to assure data security and integrity between databases. In other embodiments, each database may have a separate dedicated database server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as a thin-client computers, an Internet-enabled gaming systems, business or home appliances, and/or a personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-acceler- ated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include databases of training materials, presentations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, databases, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

Figure 2:
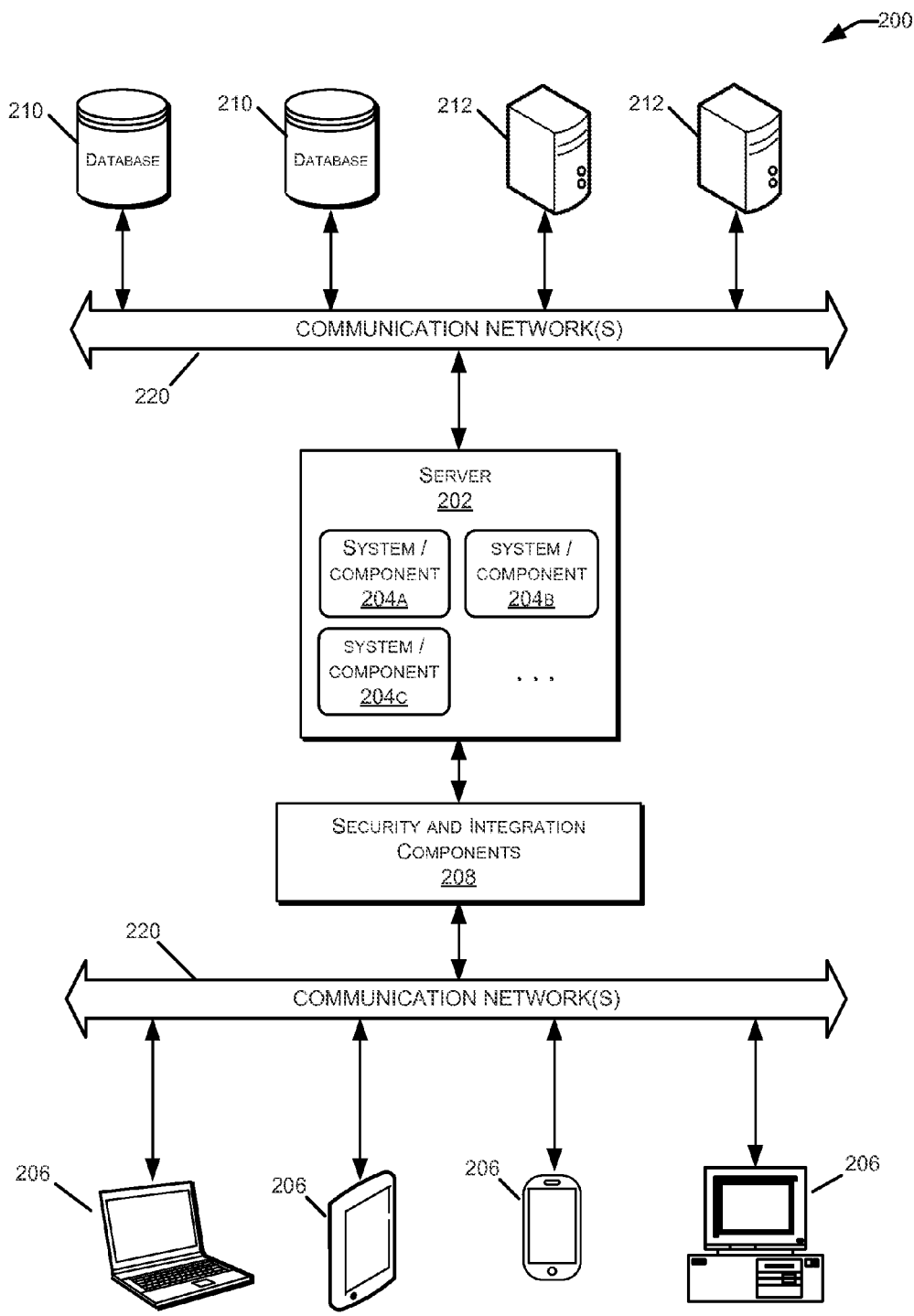
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as the Web Service Interoperability (WS-I) guidelines. For example, some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using the WS-Security standard, which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more databases 210 and/or back-end servers 212. In certain examples, the databases 210 may correspond to database server(s) 104 discussed above in FIG. 1, and back-end servers 212 may correspond to the various back-end servers 112-116. Databases 210 and servers 212 may reside in the same datacenter or may operate at a remote location from server 202. In some cases, one or more databases 210 may reside on a non-transitory storage medium within the server 202. Other databases 210 and back-end servers 212 may be remote from server 202 and configured to communicate with server 202 via one or more networks 220. In certain embodiments, databases 210 and back-end servers 212 may reside in a storage-area network (SAN).

Figure 3:
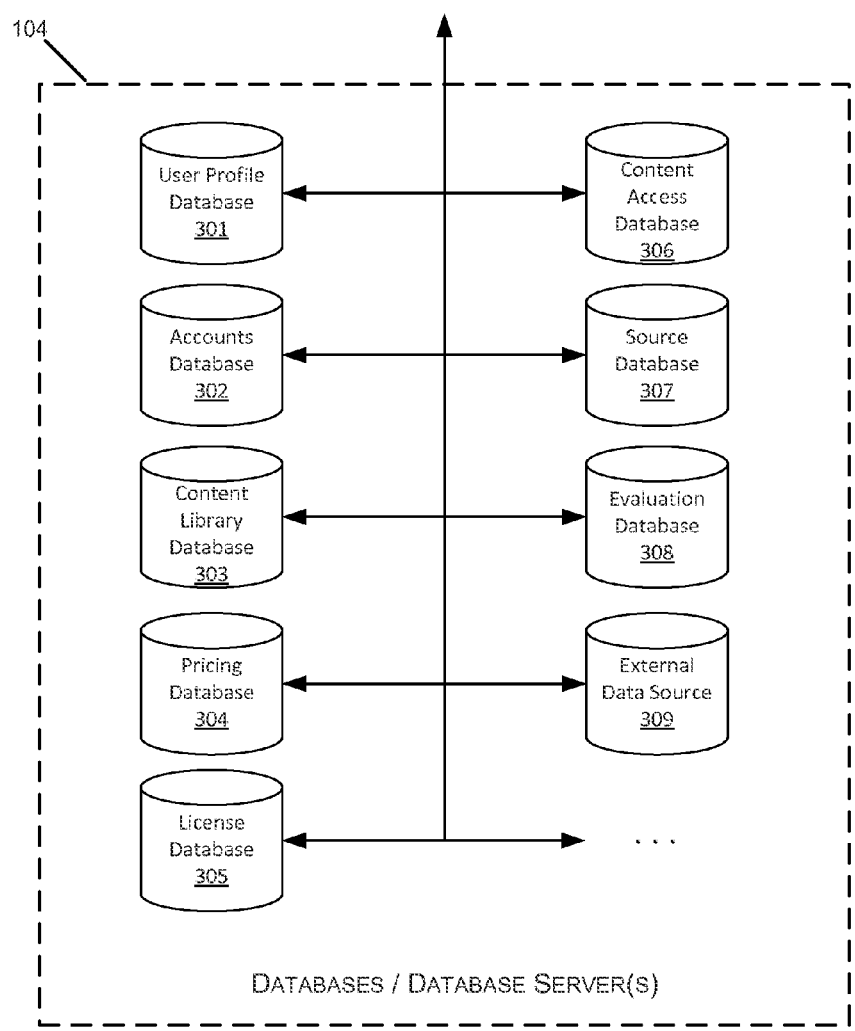
FIG. 3 is a block diagram illustrating an embodiment of one or more database servers within a content distribution network.

With reference to FIG. 3, an illustrative set of databases and/or database servers is shown, corresponding to the databases servers 104 of the content distribution network 100 discussed above in FIG. 1. One or more individual databases 301-309 may reside in storage on a single computer server 104 (or a single server farm or cluster) under the control of a single entity, or may reside on separate servers operated by different entities and/or at remote locations. In some embodiments, databases 301-309 may be accessed by the content management server 102 and/or other devices and servers within the network 100 (e.g., user devices 106, supervisor devices 110, administrator servers 116, etc.). Access to one or more of the databases 301-309 may be limited or denied based on the processes, user credentials, and/or devices attempting to interact with the database.

The paragraphs below describe examples of specific databases that may be implemented within some embodiments of a content distribution network 100. It should be understood that the below descriptions of databases 301-309, including their functionality and types of data stored therein, are illustrative and non-limiting. Database server architecture, design, and the execution of specific databases 301-309 may depend on the context, size, and functional requirements of a content distribution network 100. For example, in content distribution systems 100 used for professional training and educational purposes, separate databases may be implemented in database server(s) 104 to store trainee and/or student data, trainer and/or professor data, training module data and content descriptions, training results, evaluation data, and the like. In contrast, in content distribution systems 100 used for media distribution from content providers to subscribers, separate databases may be implemented in database server(s) 104 to store listing of available content titles and descriptions, content title usage statistics, subscriber profiles, account data, payment data, network usage statistics, etc.

A user profile database 301 may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.).

An accounts database 302 may generate and store account data for different users in various roles within the content distribution network 100. For example, accounts may be created in an accounts database 302 for individual end users, supervisors, administrator users, and entities such as companies or educational institutions. Account data may include account types, current account status, account characteristics, and any parameters, limits, restrictions associated with the accounts.

A content library database 303 may include information describing the individual content items (or content resources) available via the content distribution network 100. In some embodiments, the library database 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library database 303 may be configured to allow updating of content metadata or properties, and to allow the addition and/or removal of information relating to the content resources.

A pricing database 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage. In other cases, pricing may be tied to specific content resources. Certain content resources may have associated pricing information, whereas other pricing determinations may be based on the resources accessed, the profiles and/or accounts of the user, and the desired level of access (e.g., duration of access, network speed, etc.). Additionally, the pricing database 304 may include information relating to compilation pricing for groups of content resources, such as group prices and/or price structures for groupings of resources.

A license database 305 may include information relating to licenses and/or licensing of the content resources within the content distribution network 100. For example, the license database 305 may identify licenses and licensing terms for individual content resources and/or compilations of content resources in the content server 112, the rights holders for the content resources, and/or common or large-scale right holder information such as contact information for rights holders of content not included in the content server 112.

A content access database 306 may include access rights and security information for the content distribution network 100 and specific content resources. For example, the content access database 306 may include login information (e.g., user identifiers, logins, passwords, etc.) that can be verified during user login attempts to the network 100. The content access database 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source database 307 may include information relating to the source of the content resources available via the content distribution network. For example, a source database 307 may identify the authors and originating devices of content resources, previous pieces of data and/or groups of data originating from the same authors or originating devices, and the like.

An evaluation database 308 may include information used to direct the evaluation of users and content resources in the content management network 100. In some embodiments, the evaluation database 308 may contain, for example, the analysis criteria and the analysis guidelines for evaluating users (e.g., trainees/students, gaming users, media content consumers, etc.) and/or for evaluating the content resources in the network 100. The evaluation database 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation database 308 including data and/or instructions in the form of one or several electronic rubrics or scoring guides for use in the evaluation of the content, users, or applications. The evaluation database 308 also may include past evaluations and/or evaluation analyses for users, content, and applications, including relative rankings, characterizations, explanations, and the like.

In addition to the illustrative databases described above, database server(s) 104 may include one or more external data aggregators 309. External data aggregators 309 may include third-party data sources accessible to the content management network 100, but not maintained by the content management network 100. External data aggregators 309 may include any electronic information source relating to the users, content resources, or applications of the content distribution network 100. For example, external data aggregators 309 may be third-party databases containing demographic data, education related data, consumer sales data, health related data, and the like. Illustrative external data aggregators 309 may include, for example, social networking web servers, public records databases, learning management systems, educational institution servers, business servers, consumer sales databases, medical record databases, etc. Data retrieved from various external data aggregators 309 may be used to verify and update user account information, suggest user content, and perform user and content evaluations.

Figure 4:
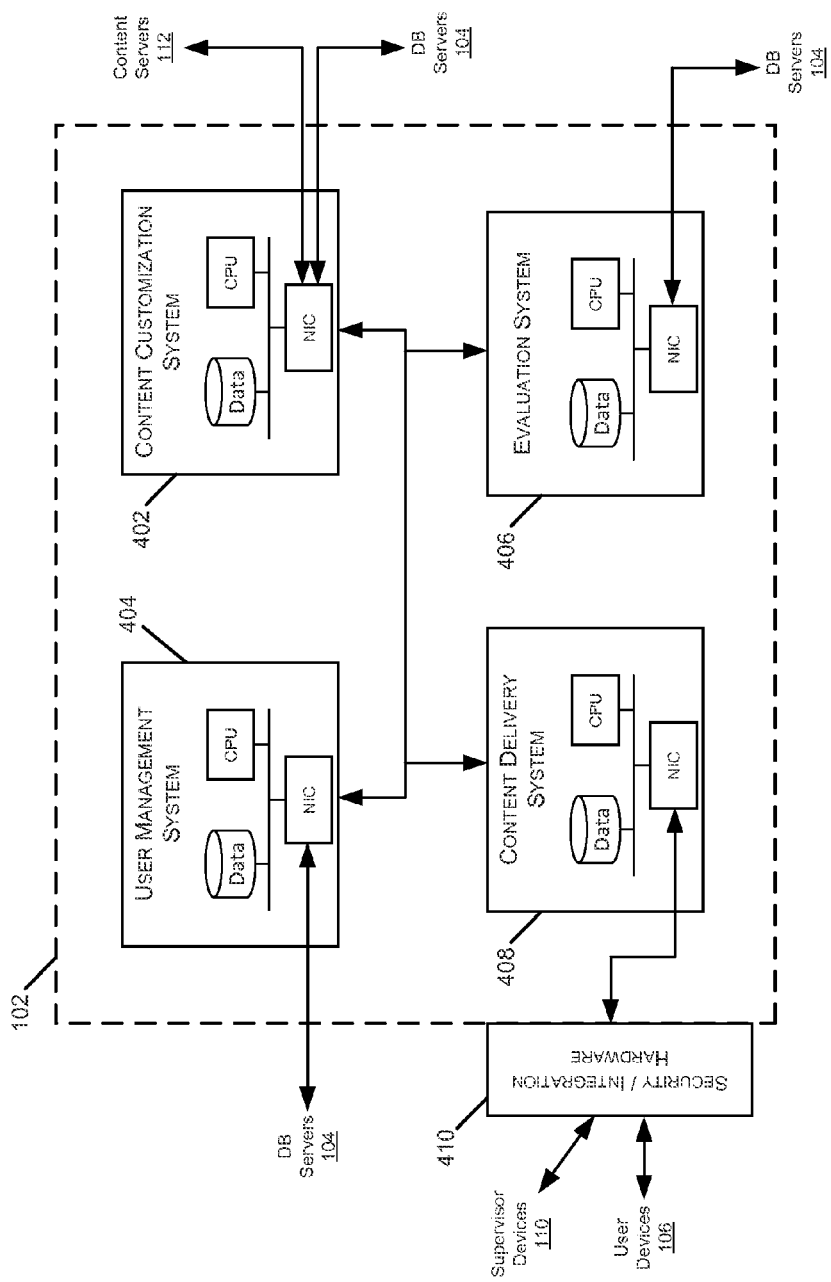
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. As discussed above, content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a content customization system 402. The content customization system 402 may be implemented using dedicated hardware within the content distribution network 100 (e.g., a content customization server 402), or using designated hardware and software resources within a shared content management server 102. In some embodiments, the content customization system 402 may adjust the selection and adaptive capabilities of content resources to match the needs and desires of the users receiving the content. For example, the content customization system 402 may query various databases and servers 104 to retrieve user information, such as user preferences and characteristics (e.g., from a user profile database 301), user access restrictions to content recourses (e.g., from a content access database 306), previous user results and content evaluations (e.g., from an evaluation database 308), and the like. Based on the retrieved information from databases 104 and other data sources, the content customization system 402 may modify content resources for individual users.

A content management server 102 also may include a user management system 404. The user management system 404 may be implemented using dedicated hardware within the content distribution network 100 (e.g., a user management server 404), or using designated hardware and software resources within a shared content management server 102. In some embodiments, the user management system 404 may monitor the progress of users through various types of content resources and groups, such as media compilations, courses or curriculums in training or educational contexts, interactive gaming environments, and the like. For example, the user management system 404 may query one or more databases and servers 104 to retrieve user data such as associated content compilations or programs, content completion status, user goals, results, and the like.

A content management server 102 also may include an evaluation system 406. The evaluation system 406 may be implemented using dedicated hardware within the content distribution network 100 (e.g., an evaluation server 406), or using designated hardware and software resources within a shared content management server 102. The evaluation system 406 may be configured to receive and analyze information from user devices 106. For example, various ratings of content resources submitted by users may be compiled and analyzed, and then stored in a database (e.g., a content library database 303 and/or evaluation database 308) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from user devices 106, supervisor devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

A content management server 102 also may include a content delivery system 408. The content delivery system 408 may be implemented using dedicated hardware within the content distribution network 100 (e.g., a content delivery server 408), or using designated hardware and software resources within a shared content management server 102. The content delivery system 408 may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
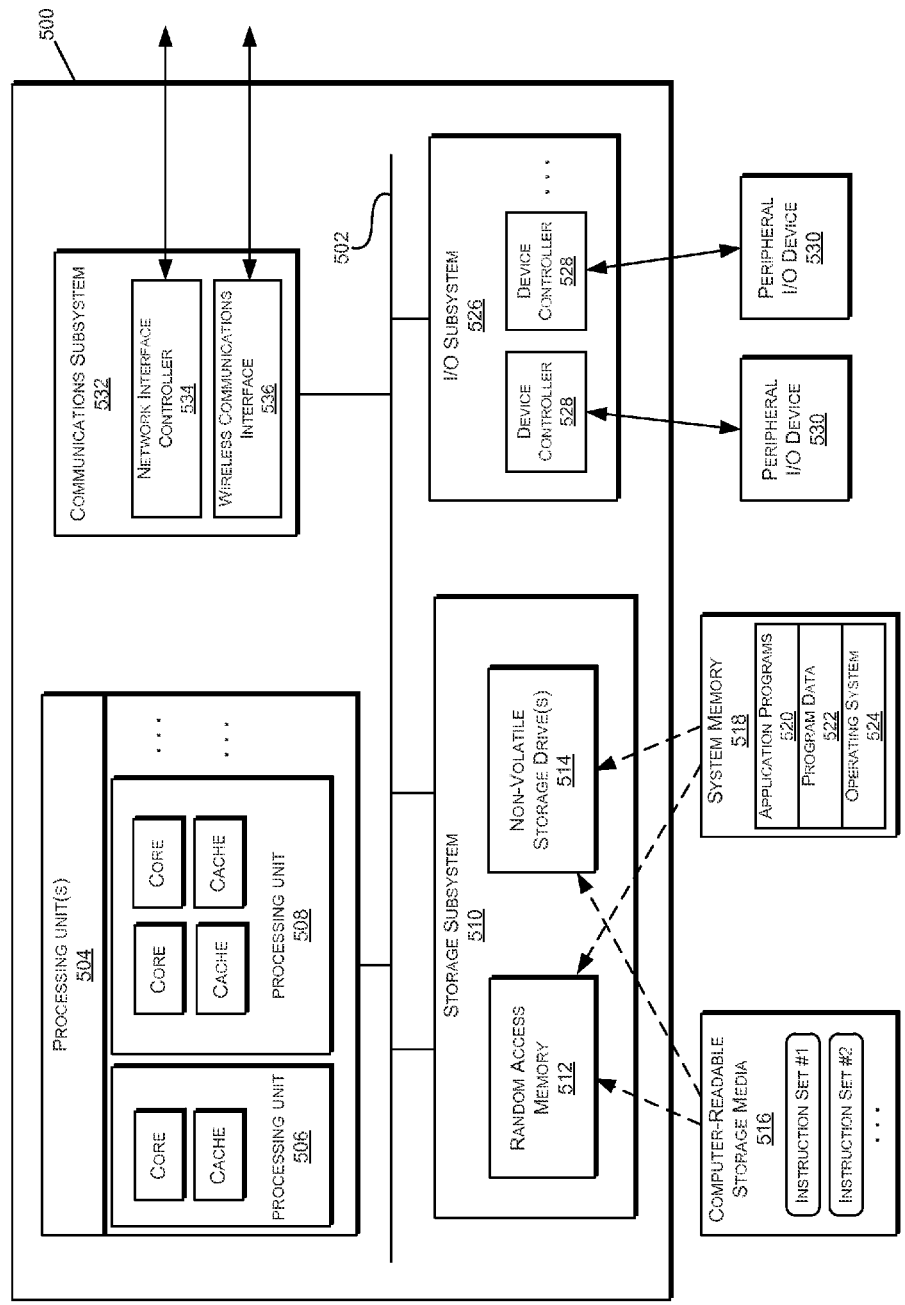
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 309). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more databases 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
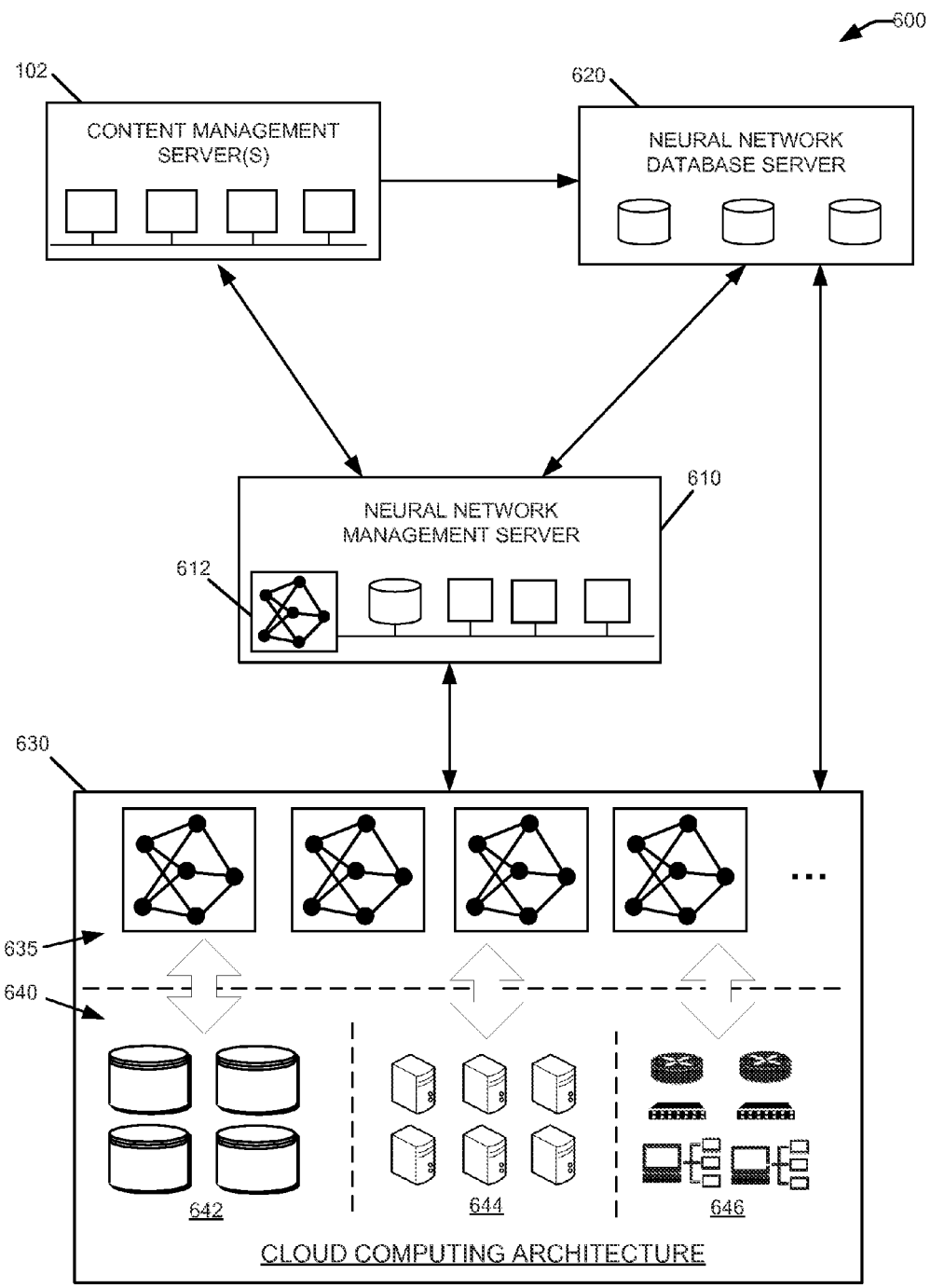
FIG. 6 is a block diagram illustrating an example of a system for dynamically updating neural networks used by a content distribution network, according to one or more embodiments of the disclosure.

With reference now to FIG. 6, is a block diagram is shown illustrating an example system for dynamically updating neural networks used by content distribution networks (CDNs). The system 600 illustrated in this example may be integrated within a content distribution network 100, or may be implemented as a separate system in communication with one or more content distribution networks 100 via network interfaces and communication network infrastructures. Specific examples of content distribution networks 100 and/or neural network generation and usage systems 600 may include, without limitation, educational and professional training systems and networks, interactive gaming systems and networks, enterprise application systems and networks, document management systems and networks, and/or media distribution systems and networks. As discussed below, each of the components shown in the example system of FIG. 6 may correspond to a single computer server or a complex computing system including a combination of computing devices, storage devices, network components, etc. Further, each of these components and their respective subcomponents may be implemented in hardware, software, or a combination thereof.

In some embodiments, neural network system 600 may include various components configured to generate and manage a set of artificial neural network data structures used to perform decision-making and/or predictive analyses based on data received from content distribution networks 100. Such neural network data structures may be designed, constructed, and trained by adaptive learning processes to analyze complex sets of inputs and provide predictive outputs. The specific types of decision-making and predictive analyses performed by a neural network system 600 may depend on the context of the content distribution networks 100 and the data used to train the neural network(s) within the system 600. For example, in content distribution networks 100 used for professional training and educational purposes (e.g., eLearning, web-based training, or other computer-based instructional systems), a neural network system 600 may be designed and trained to predict user performance in different courses, classes, online modules, tests, and the like. Such systems 600 may also be trained to predict user attendance, module selection, trends, preferences, and other individual or group behaviors within the training and educational network 100. As another example, in content distribution networks 100 used for media distribution (e.g., cable, satellite, or computer-based on-demand request and subscription services for music, movies, televisions, and the like), a neural network system 600 may be designed and trained to predict the usage patterns of end users in order to allocate sufficient computing resources and bandwidth at the appropriate times, to predict user title selections for caching, and to provide media recommendations for individual users based on past title requests. As yet another example, in content distribution networks 100 used for interactive gaming systems, a neural network system 600 may be designed and trained to predict gaming behaviors such as playing times, playing partners, game or level selection, and the like.

The example system shown in FIG. 6 includes a neural network management server 610. As discussed in more detail below, neural network management server 610 may include various components and subsystems to generate, train, store, deploy, and manage neural networks to be used by content distribution networks 100. For example, neural network management server 610 may receive a request and input data from a content management server 102 to perform a predictive analysis or other decision-making process based on the input data. In response, the neural network management server 610 may use a neural network to process the request and return the output back to the content management server 102. In some cases, the neural network management server 610 may store (e.g., in local or attached storage) the primary neural network structures 612 used to process requests from content distribution networks 100. In other cases, the neural network management server 610 may route such requests to the appropriate neural network at a remote storage location, such as within a cloud computing architecture 630, and then return the results to the content management server 102. The neural network management server 610 also may perform ongoing evaluations of one or more neural networks, and then initiate processes to generate, train, and evaluate a number of potential replacement networks, as discussed below. Additionally, the network management server 610 may receive, generate, store, and/or route the neural network training data use to train replacement neural networks 635 between the various components of the neural network system 600.

In order to perform and manage the tasks described herein for dynamically updating neural network structures, the neural network management server 610 may include a single computing server or combination of computer servers, storage devices, network components, etc. Neural network management server 610 may be implemented using any combination of the computer hardware, software, storage, and network components discussed above, such as those in illustrative computer system 500, and also may be implemented within any of the computing environments discussed above, such as content distribution network 100 and/or distributed computing environment 200. For example, neural network management server 610 may include secure storage device(s) to store primary network network(s) 612 and/or neural network training data, processors and software execution engines for accessing the neural networks and executing predictive analyses, and cloud client network interface components for handling the allocation of physical resources 640 within the cloud architecture 630, along with the generation and training of replacement candidate neural networks 635.

Neural network system 600 also may include one or more content management servers 102. As discussed above, content management servers 102 may manage and execute processes within various CDNs 100, such as educational and professional training CDNs, interactive gaming CDNs, enterprise CDNs, etc. In some embodiments, content management servers 102 may also collect and provide neural network training data to neural network management servers 610 and/or database servers 620 within neural network systems 600. Content management servers 102 also may directly or indirectly access neural network structures within the system 600 and use the neural networks to perform predictive analyses for their associated CDNs. In order to perform these tasks and others described herein, content management servers 102 may include a single computing server or combination of computer servers, storage devices, network components, etc.

In some embodiments, content management servers 102 in FIG. 6 may correspond to the same content management servers 102 in FIG. 1 and/or FIG. 4, and may include some or all of the same hardware, software, storage and network components described above.

As shown in FIG. 6, neural network system 600 may also include one or more database servers 620. As discussed below, database servers 620 may receive and store repositories of neural network training data. Separate and isolated storage devices and/or logical databases may be used for storing the training data associated with different neural network structures. In some embodiments, training data may be received from neural network management servers 610 and/or directly from content management servers 102. Database servers 620 may maintain continuously expanding sets of training data, and then securely transmit the training data to the neural network management servers 610 or the cloud computing architecture for training and evaluating new neural networks. In order to perform these tasks and others described herein, database servers 102 may include a single computing server or combination of computer servers, storage devices, network components, etc. In some embodiments, database server 620 in FIG. 6 may correspond to the same database servers 104 in FIG. 1 and/or FIG. 3, and may include some or all of the same hardware, software, storage and network components described above.

Neural network system 600 also may include a cloud computing architecture 630 to allocate and manage a set of underlying computing resources 640 that may generate and train a set of neural networks 635. In some embodiments, a plurality of replacement candidate neural networks 635 may be generated, trained, and evaluated within the cloud computing architecture 630, in order to select a replacement for a primary neural network 612 that is performing below an error threshold. In such cases, a neural network management server 610, which may be separate from or integrated within the cloud computing architecture 630, may instruct a cloud resource manager component to allocate the necessary data storage resources 642, processing resources 644, and network resources 646 for generating, training, and evaluating one or more candidate neural networks 630. The underlying resources of the cloud computing architecture 630 may include, for example, a set of non-volatile computer memory devices 642 implemented as databases 642, a set of cloud host servers 644, and a set of network hardware and software components 646 (e.g., routers, firewalls, gateways, load balancers, etc.) configured to provide protected computer network access to storage 642 and applications hosted on servers 644. The cloud computing environment 630 may also include additional cloud resources such as hypervisors, host operating systems, resource managers and other cloud applications, and the hardware and software infrastructure to support cloud services such as Infrastructure as a Service (IaaS), Platform as a Service (PaaS), and Software as a Service (SaaS). Additionally, the underlying hardware 640 of the cloud computing architecture 630 may be configured to support a number of internal shared services for generating, training, and evaluating a set of neural networks 635, such as, for example, security and identity services, integration services, repository services, enterprise management services, virus scanning services, backup and recovery services, notification services, file transfer services, and the like.

The incorporation of a cloud computing architecture 630, as shown FIG. 6, may be advantageous for certain implementations of neural network systems. For example, cloud computing architectures 630 may provide the neural network system 600 with the elasticity and scalability to quickly generate and train many large and complex neural networks, in contrast to non-cloud based implementations having fixed architectures and limited hardware resources. However, it should be understood that other embodiments of neural network systems may be implemented without using a cloud computing architecture 630. For example, in certain embodiments, a plurality of replacement candidate neural networks 635 may be generated within neural network management servers 610, database servers 620, and/or storage device(s) attached thereto. In other examples, client-server or other distributed computing architectures may be used to generate, train, and evaluate neural networks 635, rather than cloud-based architectures.

Figure 7:
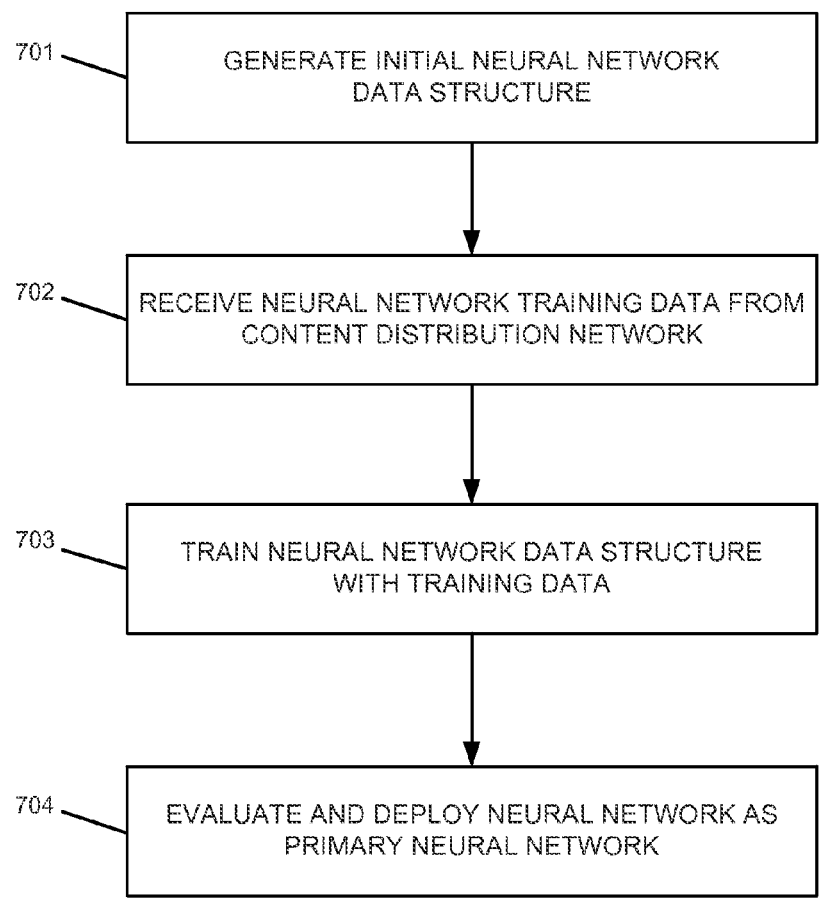
FIG. 7 is a flowchart illustrating an example process of generating and training a neural network for use by a content distribution network, according to one or more embodiments of the disclosure.

Referring now to FIG. 7, a flow diagram is shown illustrating a process of generating and training a neural network for use by a content distribution network. As described below, the steps in this process may be performed by one or more components in the example neural network system 600, such as neural network management servers 610, database servers 620, content management servers 102, and/or cloud computing architectures 630. However, it should be understood that the generation, training, and testing of neural network data structures need not be limited to the specific systems and hardware implementations described above in FIGS. 1-6, but may be performed within other hardware and system environments comprising other combinations of the hardware and software components described herein.

In step 701, a first neural network data structure is generated within a neural network computing environment, such as neural network system 600. For example, the initial data structure for the neural network may be generated at a neural network management server 610 or by dynamically allocating resources within the cloud computing architecture 630 to host the neural network. In some embodiments, the neural network data structure may include a plurality of nodes (or neurons), a set of links defining interconnections between different pairs of nodes, and weight values associated with each interconnection. Using the interconnections between nodes, neural networks may be structured in layers. For example, a neural network may include a first layer of one or more input nodes, connected to one or more layers of internal nodes, connected to one or more output nodes. In such examples, the input node(s) may correspond to input data received from a CDN relating to a decision-making or predictive analysis problem within the CDN, and the output node(s) may correspond to the decision or prediction output by the neural network.

For example, in a CDN 100 used for professional training and educational purposes, neural network inputs may correspond to various user records within the training and educational CDN, such as courses or modules completed by trainees or students, scores received for courses, modules, tests, and/or individual questions, attendance records, relevant times of dates of all user actions, course or module selections by trainees or students, user preferences, trends, and/or any other individual or group behaviors within the training and educational CDN 100. In such examples, one or more neural network outputs may correspond to predictions on the performance of individual users (e.g., trainees or students) or groups of users for training and educational courses or modules, tests, questions, etc. Additional neural network outputs for training and educational CDNs 100, predicted by the same or different neural network structures, may include predictions of user attendance, module or course selection, user trends and preferences, user participation, dropout rates, and other individual or group behaviors within CDN 100.

In other examples, for CDNs 100 used for other purposes (e.g., media content distribution, interactive gaming, online sales, etc.), the neural networks may have different sets of inputs data and predictive outputs. For instance, for a CDN 100 used to provide on-demand request and subscription services for music, movies, televisions over cable, satellite, or computer-based networks, neural networks may be constructed to predict outputs such as future user selections, usage times and patterns, and to provide media content recommendations for users. The neural network inputs in such cases may be, for example, user demographics, previous media selections, previous usage times and media consumption patterns, and user ratings previous consumed media content. As another example, for a CDN 100 used to provide interactive gaming services to users, neural networks may be constructed to predict outputs such as future game module or level selections, future gaming times and patterns, and to provide user recommendations for the selection of games, modules, online teammates or competitors, and the like. In these examples, the neural network inputs may be previous gaming selections, scores, and performance, previous gaming times and usage patterns, and user rating or feedback regarding previous interactions with games, modules, levels, and other users. Additionally, for a CDN 100 directed to online sales or user browsing traffic, neural networks may be constructed to predict outputs such as search results, product selections and recommendations, based on neural network inputs such as user demographics and profile data, previous user actions, browsing history, previous online purchases, and the like. It should be understood that the above examples are non-limiting, and in further examples neural networks may be used to generate predictions or other decision-making outputs based on related sets of inputs for any other CDN or other computer system and network having any other computing architecture and functional purpose.

In step 702, training data for the neural network is received from one or more associated content distribution networks 100. As discussed below in more detail, neural network training data may be used to train a neural network, by making adjustments in the weight values of the node interconnections in the neural network, in order to improve and/or optimize the performance of the neural network in making predictive outputs. Neural network training data may be sets of input and output data records, and may correspond to previously observed behavior within the CDN 100, such as previous user actions, selections, usage patterns, group and individual behaviors, etc. Each record may include a set of one or more inputs and an output corresponding to the "correct" prediction, that is, the observed or desired outcome associated with the training data. In step 702, the neural network training data may be received by, for example, a neural network management server 610 in a neural network system 600. The neural network management server 610 may receive the training data from a training database 620, or directly from one or more servers within CDNs 100 (e.g., content management servers 102). In some embodiments, the sets of neural network training data received in step 702 may include a plurality of database records, one or more batch files, or records received from a streaming data source (e.g., database server 620 or content management servers 102).

In step 703, the neural network generated in step 701 is trained using the training data received in step 702. During the training process, the training data may be iteratively run through the neural network data structure. Within each iteration, the input values of one or more training data records may be fed to the input nodes of the neural network, and the resulting neural network output may be compared to the "correct" output from the corresponding training data record. Before the first iteration, the interconnection weight values of the neural network data structure may be randomly assigned. The training process may be an iterative learning process during which a neural network algorithm, such as a back propagation algorithm, is used continuously adjust the interconnection weight values of the neural network data structure in order to improve the overall results of the neural network in predicting the outputs of the training data.

In step 704, after the neural network data structure has been trained based on the training data, the neural network may be evaluated and then stored and/or deployed as a primary neural network available for use by one or more content distribution networks 100. In some embodiments, the evaluation of the neural network may use evaluation data records similar to the training data records used in step 703. For example, a random set of neural network training data records may be excluded from the training data used in step 703 and designated as evaluation data. In other examples, a separate set of evaluation data may be received from the CDN 100 based on a recent set of user interactions collected after the training data. The evaluation data may be run through the trained neural network, by providing evaluation record inputs to the input nodes, and then comparing the neural network outputs to the corresponding evaluation record outputs. If a sufficient number of training data records were used, and if the training data records are representative of the evaluation records (and presumably also representative of the current user interactions occurring within the CDN 100), then the neural network will likely accurately predict the outputs of the evaluation data within an acceptable error threshold. If the trained neural network does not accurately predict the evaluation record outputs within an acceptable error threshold, this may indicate that an insufficient amount of training data was used, or that the training data and/or the evaluation data was statistically anomalous and not representative of typical user interactions within the CDN 100. In such cases, the neural network data structure may be returned for further training with additional and/or alternative training data.

If the trained neural network accurately predicts the evaluation record outputs within an acceptable error threshold, then the neural network may be deployed within the neural network system 600 and/or CDN 100. For example, the neural network may be stored on a neural network management server 610 and designated as a primary neural network 612. In other examples, primary neural networks 612 may be stored elsewhere within a neural network system 600, such as on a database server 630 or within a cloud architecture 630, or may be stored within a content management server 102 of the CDN 100. As discussed below in FIG. 8, the primary neural network(s) within a neural network system 600 and/or CDN 100 may be accessed by various components of the CDN 100 to provide predictive analyses and decision making outputs based on user interactions and other input data from the CDN 100.

Figure 8:
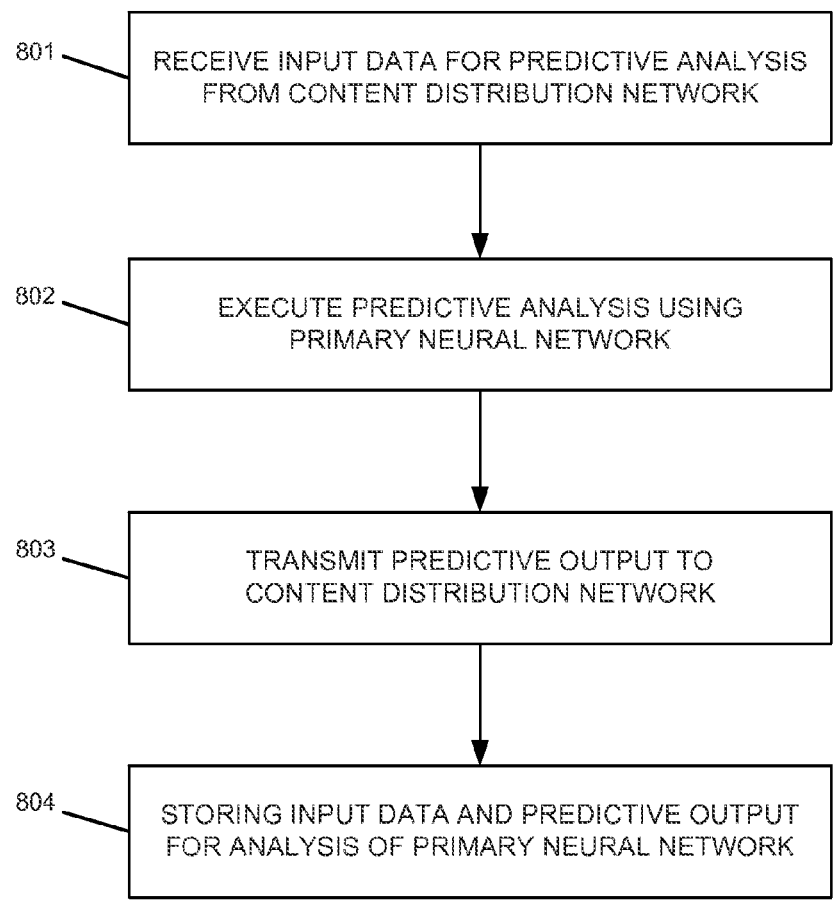
FIG. 8 is a flowchart illustrating an example process of using a neural network to perform a predictive analysis for a content distribution network, according to one or more embodiments of the disclosure.

Referring now to FIG. 8, a flow diagram is shown illustrating a process of accessing a trained neural network to perform a predictive analysis or generate another decision-making output for a content distribution network. As described below, the steps in this process may be performed by one or more components in the example neural network system 600, such as neural network management servers 610, database servers 620, content management servers 102, and/or cloud computing architectures 630. However, it should be understood that the execution of predictive analysis and decision-making processes using neural networks need not be limited to the specific systems and hardware implementations described above in FIGS. 1-6, but may be performed within other hardware and system environments comprising other combinations of the hardware and software components described herein.

In step 801, input data is received from a CDN 100 to be used for a predictive analysis or decision-making process performed by a neural network. For example, a neural network management server 610 may receive a request from a content management server 102 to perform a predictive analysis of a future user behavior within the CDN 100. The content management server 102 may provide input data to the neural network management server 610, such as the user's previous interactions with the CDN 100, user demographic information, and other relevant user data. In some embodiments, the input data may be received from multiple different data sources. For example, a content management server 102 may transmit a request for a predictive analysis of a user behavior in CDN 100, and may provide a user identifier and one or more recent user behaviors or other user data. After receiving the request, the neural network management server 610 may retrieve additional input data relating to the requested predictive analysis from the CDN 100, or from other external computer servers. Such additional input data may include, for example, demographic data, financial data, educational or occupational data, social network data, etc., relating to the user about which the predictive analysis was requested.

As discussed above, the input data received in step 801 may depend on the computing architecture and/or functional design of the CDN 100, as well as the type of analysis or decision-making processing desired. For example, in a professional training and educational CDN 100, the input data received in step 801 may include demographic data and/or previous user records of a trainee or student user of the CDN 100, such as courses or modules completed, scores received on courses, modules, or tests, responses to specific questions, user attendance records, relevant times of dates of all user actions, course or module selections by trainees or students, user preferences, trends, and/or any other individual or group behaviors collected by the CDN 100. For a CDN 100 used to provide on-demand media content to users, the input data received in step 801 may include, for example, user demographic data, previous user selections of media, previous usage times and media consumption patterns, and previous user ratings of media content. For an interactive gaming CDN 100, the inputs received in step 801 may include, for example, previous gaming selections, scores, and performance, previous gaming times and usage patterns, and user rating or feedback regarding previous interactions with games, modules, levels, and other users. For an eCommerce or enterprise CDN 100, the inputs received in step 801 may include, for example, user demographics and profile data, previous user actions, browsing history, previous online purchases, and the like.

In step 802, the neural network management server 610 may access a primary neural network to execute the requested predictive analysis or other decision-making process using the input data received in step 801. In some embodiments, each type of requested predictive analysis may have an associated primary neural network 612, and the neural network management system may include a different primary neural networks 612 for each type of requested analysis or output. Therefore, in step 802, the neural network management server 610 may provide the input data received in step 801 to the appropriate primary neural network data structure 612, and then collect and store the corresponding neural network output(s). In step 803, the output received via the primary neural network is provided back to the content management server 102 or other device that initiated the request.

The neural network outputs generated in step 802, and provided back to the CDN 100 in step 803, may depend on the architecture and/or the functional design of the CDN 100, as well as the type of predictive analysis or decision-making processing desired. For example, neural network outputs in a professional training and educational CDN 100 may include predictions regarding user performance for specific courses, modules, or tests, user selections of courses or modules, user participation behaviors, user dropout probabilities, and the like. Neural network outputs for media distribution CDNs 100 may include, for example, predictions of user selections or user suggestions for music, movies, and television content, and predictions of future usage patterns and behaviors for individual users (e.g., usage times and days, data usage amounts, etc.). Neural network outputs for interactive gaming CDNs 100 may include, for example, predictions of gamer selections of games, modules, levels, scores, multi-player teams, competitors, etc., and predictions of future usage patterns and behaviors for individuals and groups of gamers. Neural network outputs for eCommerce or enterprise CDNs 100 may include, for example, predictions of user product or link selections, advertising suggestions, or product selections to provide to a user via the CDN 100.

In step 804, after transmitting the predictive output to the content distribution network 100, both the input data (received in step 801) and the predictive output (determined using the primary neural network in step 802) may be stored for subsequent analyses of the primary neural network. For example, the input data and predictive outputs generated by a primary neural network 612 may be stored within a neural network management server 610, data store server 620, and/or in cloud storage 630. Step 804 may be performed before, after, or concurrently with step 803. Additionally, step 804 may optional in some embodiments, but when performed, may potentially improve the speed and efficiency of the system when subsequent processes are used to evaluate the primary neural network data structure 612 and/or to generate and train potential replacement candidate neural networks, as described below in FIG. 9.

In the above examples and other implementations of neural network systems 600 and/or CDNs 100, the neural network output received in step 803 may be used to allocate computing resources and/or customize user experiences within CDNs 100. For example, predictive analyses of user behavior may be used to suggest specific products, links, media content, games, or eLearning courses or modules to specific users. Such predictive analyses may also be used to anticipate user behaviors in order to estimate future hardware usage, network usage, and software usage within the CDN 100, so that the CDN 100 may allocate sufficient resources to provide system performance and stability.

Figure 9:
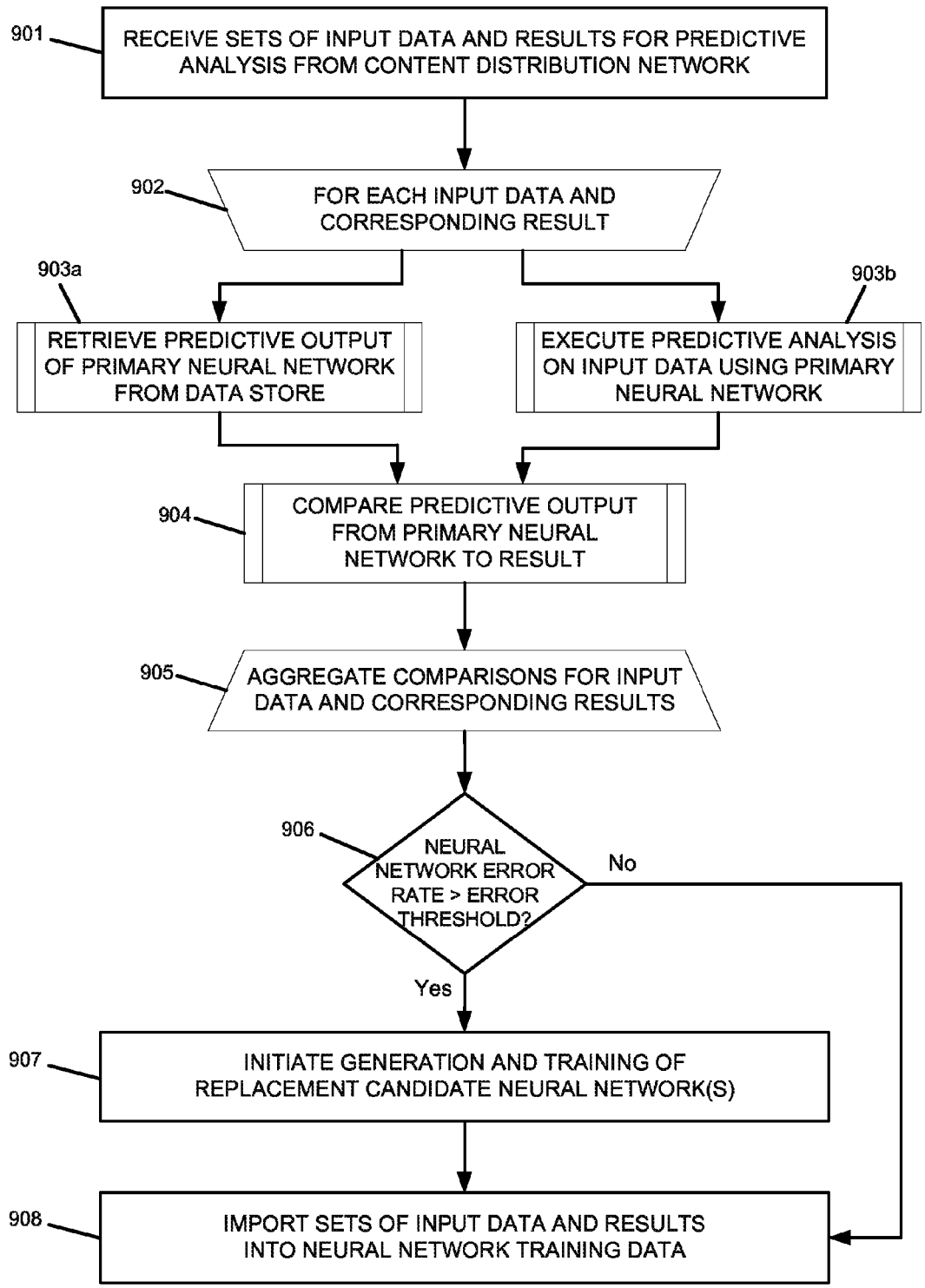
FIG. 9 is a flowchart illustrating an example process of evaluating a neural network of a content distribution network, according to one or more embodiments of the disclosure.

Referring now to FIG. 9, a flow diagram is shown illustrating a process of evaluating a neural network data structure and, based on the results of the evaluation, initiating a process to generate and train a set of potential replacement candidate neural networks. As described below, the steps in this process may be performed by one or more components in the example neural network system 600, such as neural network management servers 610, database servers 620, content management servers 102, and/or cloud computing architectures 630. However, it should be understood that the evaluation of neural networks and the generation and training of replacement neural networks need not be limited to the specific systems and hardware implementations described above in FIGS. 1-6, but may be performed within other hardware and system environments comprising other combinations of the hardware and software components described herein.

In step 901, one or more data records, including neural network input data and corresponding outputs for a specific neural network 612, are received by a neural network management server 610. Like the neural network training data received in step 702, each data record received in step 901 may include a set of neural network input data and an output result corresponding to the "correct" prediction. As with the training data received in step 702, each received output represents the "correct" predictive result in that it was actual user behavior observed and collected from within the CDN 100 in response to the corresponding input data. Thus, each result data received in step 901 also represents the desired output when the neural network 612 is provided with its corresponding input data.

Although the predictive analysis data received in step 901 may be similar to the neural network training data, the data received in step 901 may preferably include input and output data that was not used to train the neural network 612, so that this data may be more effective in evaluating the neural network 612. In some embodiments, the predictive analysis data received in step 901 may correspond to data records of more recent user interactions and behaviors within the CDN 100 that were only collected after neural network 612 was trained. As discussed above, by periodically or continuously using recent data to evaluate neural networks 612 that were trained with older data, it may be possible to determine when certain neural networks 612 have become ineffective as predictive analyses tools due to recent changes in the CDN 100 (e.g., new users, new content items, new system hardware, new applications, etc.) and/or recent external changes (e.g., macro-economic changes affecting users of the CDN 100, changes in social trends or user preferences, etc.).

In some embodiments, the predictive analysis data received in step 901 may be received as set of multiple data records, for example, as a batch file transfer, from a database, or from a streaming data source at a content management server 102 or database server 620. For instance, after a neural network 612 has been trained and deployed, the content management server 102 may continue to collect and stored the predictive analysis input data provided to the neural network 612, along with the observed user behaviors and results relating to the predictive analysis. At periodic intervals, the content management server 102 may transmit the most recent batch of predictive analysis input data and observed results to the neural network management server 610. In other embodiments, the predictive analysis data received in step 901 may be individual data records, each including a set of inputs and one or more outputs, that may be collected and used to evaluate the neural network 612 in real-time or near real-time. For example, each time the neural network management server 610 receives a set of neural network input data from a CDN 100 in step 801, the server 610 may store and retain a copy of the input data. After executing the predictive analysis and providing the predictive results by the CDN 100, the CDN 100 may provide a subsequent response back to server 610 indicating the accuracy or inaccuracy of the prediction. For example, after a neural network management server 610 provides a neural network-based prediction to a CDN 100 corresponding to a user's next product selection or purchase, a user's score in an online test, course, or game, or a user's next selection of an on-demand media content, then the CDN 100 may track the user's subsequent selections and behaviors and may provide a response back to the neural network management server 610 including the user's subsequent product selection or purchase, the user's subsequent score in the online test, course, or game, and the user's subsequent selection of on-demand media content, etc.

Regardless of whether the predictive analysis data is received in step 901 as a batch of multiple records or a stream of individual records, each data record may be used separately to evaluate an associated neural network 612 in steps 902-904. In step 902, the predictive analysis data records may be separated and processed individually, for example, by the neural network management server 610 and/or the content management server 102. In step 903, the input data from the record may be provided to the input nodes of the neural network 612. Thus, step 903 may be similar to step 802, discussed above. In step 904, the output data received from the output nodes of the neural network 612 may be compared to the "correct" output for the data record received in step 901, thereby evaluating the accuracy of the predictive analysis performed by the neural network 612 for each data record individually. In step 905, the individual evaluations of the neural network 612 may be aggregated to create an overall evaluation of the accuracy of the predictive analysis for the set of multiple predictive analysis data records received in step 901.

As shown in FIG. 9, determining the predictive output of the neural network 612 in step 903 may or may not include running the input data for the record through the neural network 612. For example, in embodiments in which the previous input data and corresponding predictive outputs are retained and stored within the system 600 (such as described in step 804 above), then the determination in step 903 may potentially be performed without invoking the neural network 612. For instance, if step 804 is performed, then the process execution may begin with step 903a, which may attempt to match the input data for the current record to any previous input data stored in step 804 for the same neural network 612. If matching input data is found in step 903a, then the corresponding predictive output recorded in step 804 may be used as the determined predictive output in step 903, without needing the rerun the same input data through the neural network 612. Alternatively, step 903b may be performed in other cases, for example, if step 804 has not been performed to store the previous input data and predictive outputs, or if step 903a was unsuccessful and a match could not be found to the input data for the current record. In such cases, in step 903b, the input data for the current record may be run through the primary neural network 612 by providing the input data the input nodes of the neural network 612 and storing the output. Thus, step 903b may be similar to step 802, discussed above.

When a neural network 612 used by a CDN 100 is evaluated using individual predictive analysis data records in steps 903-904, the results of evaluation may be binary (e.g., successful prediction or unsuccessful prediction) or may be quantified into degrees of success/accuracy. For example, predictive analyses performed by neural networks 612 that output suggestions for media content or advertisements to display to a user via a CDN application may be evaluated in a binary manner based on whether or not the selected the suggested content or advertisement. In contrast, predictive analyses by performed neural networks 612 that output predictions of a user's score for test, module, course, or game, or predict the user's future CDN usage levels and patterns (e.g., network bandwidth used, system access times, etc.) may be evaluated based on degrees of accuracy rather than in a binary manner. In either case, the aggregation of the individual evaluations of the neural network 612 in step 905 may generate an aggregate error rate for the neural network 612. For predictive analyses by neural network 612 evaluated in a binary manner, the aggregate error rate calculated in step 905 may correspond to the rate of successful predictions by the neural network 612 (e.g., 50% successful predictions, 80% successful predictions, etc.). For predictive analyses by neural network 612 evaluated in a non-binary manner, the aggregate error rate calculated in step 905 may correspond to an average degree of accuracy of predictions by the neural network 612 (e.g., 75% average accuracy, 90% average accuracy, etc.). Either type of aggregate error rate may be compared to a correspond type of error threshold in step 906.

In step 906, the aggregate error rate for the neural network 612 calculated in step 905 may be compared to a predetermined error threshold designated for the neural network 612. As noted above, the predetermined error threshold may correspond to minimum rate of successful predictions by the neural network 612, or an average degree of accuracy of predictions by the neural network 612. In some embodiments, the predetermined error threshold for the neural network 612 may be set by an administrator other authorized user of the CDN 100 or system 600, and stored within a secure data storage of the neural network management server 610 or elsewhere within the CDN 100 or system 600. As discussed above, the performance level of the predictive analyses made by a neural network 612 may deteriorate over time due to changes in the CDN 100 (e.g., new users, new content, new hardware or software, etc.) and/or other external factors (e.g., economic changes, changes in user trends and patterns, etc.). Therefore, by establishing a predetermined error threshold for the neural network 612, and periodically evaluating the neural network 612 against that threshold, the performance level of the predictive analyses made by the neural network 612 may be ensured to remain suitably high for the CDN 100.

Different neural networks 612 performing different types of predictive analyses may have different associated error thresholds. For example, certain predictive analyses (e.g., predicting user test scores or course/module passage rates for a professional training or educational CDN 100) may have higher overall accuracy rates than other predictive analyses (e.g., selecting online advertisements for users that will result in ad selection and/or product purchases). Additionally, CDNs 100 may prioritize predictive analyses differently, so while a small degradation in the performance level of a first neural network 612 might not be important to the overall effectiveness or goals of the CDNs 100, the same amount of degradation in the performance level of a second neural network 612 may be much more detrimental to the CDN 100. Additionally, the error thresholds associated with various neural networks 612 may be dynamically adjusted after deployment of the neural networks, for example, based on the changing priorities of the CDN administrators and/or the changing costs of replacing a neural network. For instance, as discussed below, replacement of a neural network may include allocating and using resources from a cloud computing architecture 630. Depending on the current cost and/or availability of the cloud computing resources, the neural network management server 610 and/or the content management server 102 may raise or lower the current error thresholds associated with one or more neural networks 612.

In step 907, if the aggregate error rate for the neural network 612 calculated in step 905 is greater than the error threshold for the neural network 612 (907:Yes), then the neural network management server 610 (or other component within CDN 100 or system 600) may initiate a process to generate and train one or more replacement candidate neural networks. An example of this process is described below in reference to FIG. 10. In some embodiments, a set of replacement candidate neural networks 630 may be generated and trained within a cloud computing architecture 630; however, other embodiments may generate and train one or more replacement candidate neural networks without using a cloud computing architecture 630. In either case, the replacement candidate(s) may be trained and evaluated, after which the neural network management server 610 may determine whether or not to replace the current primary neural network 612 with a replacement candidate neural network.

In step 908, regardless of whether the neural network management server 610 (or other component within CDN 100 or system 600) initiates the generation and training of replacement candidates for the neural network 612, the predictive analysis input data and corresponding results received in step 901 is added to the store of future training data associated with neural network 612. Therefore, the next time that one or more new neural networks are generated and trained as replacement candidates for neural network 612, whether that occurs as a result of step 907 or not, the training process will use both the previous training data and the newly received predictive analysis data records. As discussed above, the training data sets associated with a neural network 612 may be stored within the neural network management server 610, database server 620, content management server 102, or elsewhere within the CDN 100 or system 600. Therefore, in step 908, the predictive analysis input and results data received in step 901 may be transmitted and imported into databases, batch files, or other storage structures in the appropriate storage devices within the CDN 100 and/or system 600.

Figure 10:
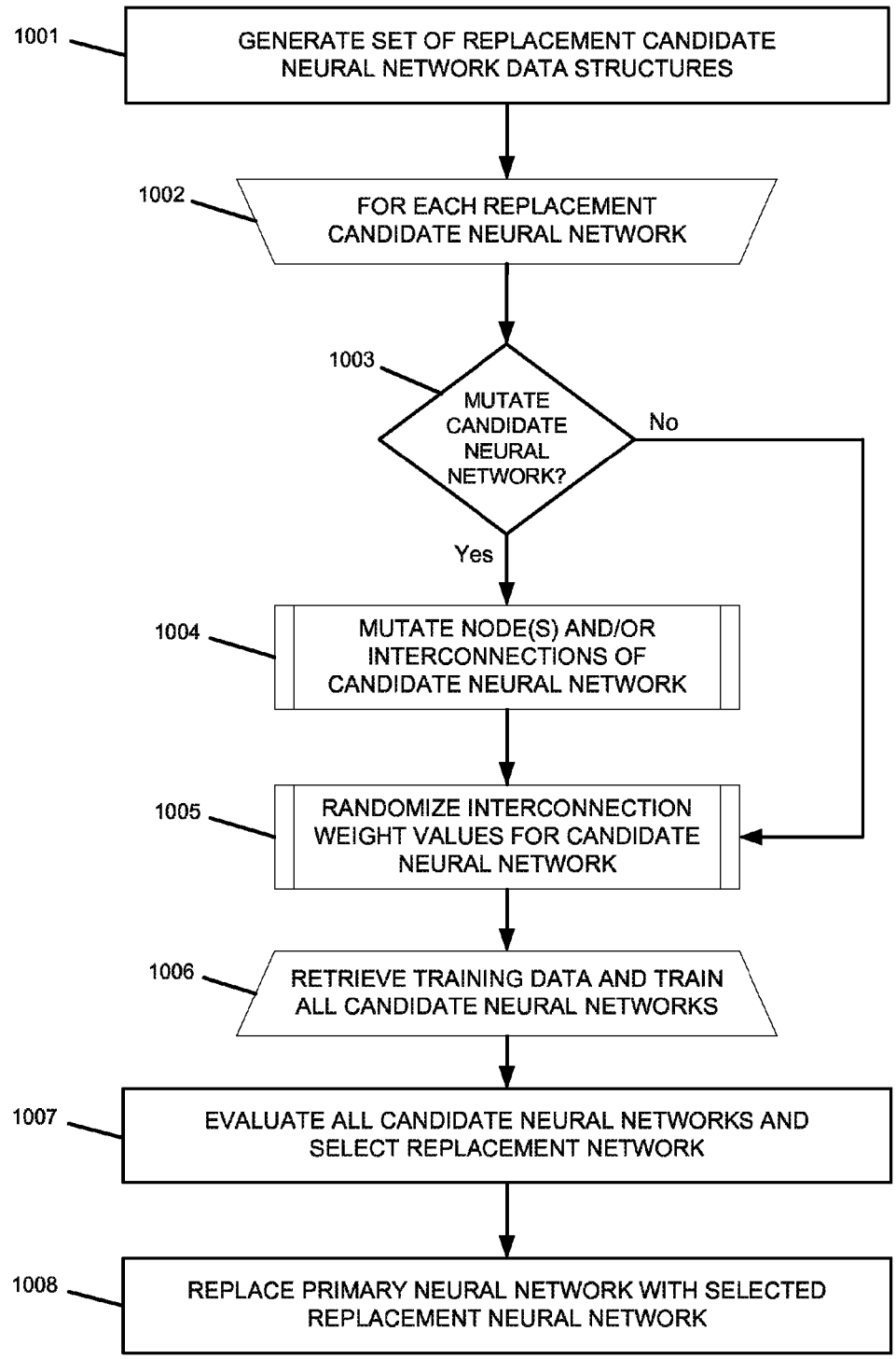
FIG. 10 is a flowchart illustrating an example process of generating and evaluating a plurality of replacement candidate neural networks for use by a content distribution network, according to one or more embodiments of the disclosure.

Referring now to FIG. 10, a flow diagram is shown illustrating a process of replacing a neural network data structure by generating, training, and evaluating a set of potential replacement neural networks. As described below, the steps in this process may be performed by one or more components in the example neural network system 600, such as neural network management servers 610, database servers 620, content management servers 102, and/or cloud computing architectures 630. However, it should be understood that the generation, training, and evaluation of potential replacement neural networks need not be limited to the specific systems and hardware implementations described above in FIGS. 1-6, but may be performed within other hardware and system environments comprising other combinations of the hardware and software components described herein.

In step 1001, one or more candidate neural network data structures are generated as potential replacements for an existing neural network 612. For example, a neural network management server 610 may initiate a process to generate a number of potential replacement neural networks after determining that a primary neural network 612 deployed for a CDN 100 is performing below an acceptable error threshold.

In some embodiments, the set of replacement candidate neural network data structures 635 may be created within the cloud computing architecture 630. For example, a cloud client process executing on the neural network management server 610 may instruct the cloud to allocate sufficient computing resources 640 and generate N number of neural network data structures. In some embodiments, each of the replacement candidate neural networks may be generated with an identical node and interconnection structure as the primary neural network 612 to be replaced.

The number of replacement candidate neural network data structures generated in step 1001 may depend on administrator or user preferences within the CDN 100 or system 600, along with a variety of other factors. In some cases, only a small number of replacement candidates 635 (or even a single candidate) may be generated, while in other cases dozens or even hundreds of replacement candidates 635 may be generated. In certain embodiments, the neural network management server 610 may determine the number of replacement candidates 635 to generate based on at least one of the priority, size, and structure of the primary neural network 612 to be replaced, as well as based on the cost and availability of resources in the cloud computing architecture 630 (or other computing environment in which the candidate neural networks will be generated). For instance, if the primary neural network 612 to be replaced performs high priority predictive analyses for the CDN 100, so that a small degradation in the performance level of the neural network 612 might significantly impact the overall effectiveness or goals of the CDNs 100, then the neural network management server 610 may determine that a large number of replacement candidates 635 should be generated in order to increase the likelihood of training a highly accurate replacement neural network. In contrast, a lower number of replacement candidates 635 may be generated when replacing lower priority neural networks 612. As another example, if the primary neural network 612 is very large in size (e.g., 100's of MBs, GBs, or TBs, etc.), then the cost or availability of cloud resources 640 may cause the neural network management server 610 to generate fewer replacement candidates 635 than if the neural network 612 to be replaced was smaller in size. Additionally, if the node and interconnection structure of the neural network 612 to be replaced is highly complex, then the neural network management server 610 may determine that a larger number of replacement candidates 635 should be generated in order to increase the likelihood of training an accurate replacement neural network. In contrast, if the neural network 612 to be replaced has a relatively simple node and interconnection structure, then the neural network management server 610 may determine that an accurate replacement is likely to be generated even if fewer replacement candidates 635 are generated. Moreover, the determination of the number of replacement candidates 635 to be generated in step 1001 may depend on the cost and availability of resources in the cloud computing architecture 630 (or other computing environments used to host to the generation and training processes), so that dynamic fluctuations in the current cost or availability of cloud computing resources 640 may affect the determination of the neural network management server 610 to generate N number of replacement candidate neural networks 635.

In steps 1002-1006, the replacement candidate neural network data structures 635 generated in step 1001 may be individually trained using the same set of neural network training data. As discussed above, the neural network training data may correspond to the same set of training data used to train the primary neural network 612 to be replaced and/or any additional predictive analysis data records received after the primary neural network 612 was trained and deployed. As indicated in step 1002, each of steps 1003-1006 may be performed separately for each replacement candidate neural network 635.

In step 1003, individual determinations are made whether or not to mutate each replacement candidate 635. For example, the neural network management server 610 may execute a genetic mutation algorithm designed to perform random mutations on a predetermined percentage (e.g., 5%, 10%, . . . , 50%, etc.) of the replacement candidate neural networks 635. If the neural network management server 610 selects a particular replacement candidate 635 for mutation (1003:Yes), then that replacement candidate 635 will be mutated in step 1004. The particular mutations, which also may be determined randomly by a genetic mutation algorithm, may include adding or removing one or more nodes within the data structure of the replacement candidate 635, adding or removing one or more interconnections between nodes within the data structure of the replacement candidate 635, and/or moving one or more nodes to a different node layer within the data structure of the replacement candidate 635.

In step 1005, for both the mutated and the non-mutated replacement candidate neural networks 635, each of the interconnection weight values within the data structure may be randomly assigned by the neural network management server 610. Thus, even for the non-mutated replacement candidates 635, the random assignment of the initial weight values may result in differences in the final trained neural networks.

In step 1006, each of the replacement candidate neural networks 635 is trained using the same set of training data. As discussed above, the neural network training data may include, for example, the same set of training data used to train the primary neural network 612 to be replaced and/or any additional predictive analysis data records received after the primary neural network 612 was trained and deployed. The neural network training process performed in step 1006 may be similar to the initial training process described in step 702. For example, neural network management server 610 may retrieve the training data as a plurality of database records, one or more batch files, or records received from a streaming data source (e.g., database server 620 or content management servers 102), and then provide the training data to the replacement candidate neural networks 635 within the cloud computing architecture 630. In other examples, hosted applications executing on the cloud computing architecture 630 may be configured to directly retrieve the training data (e.g., from database servers 620 and/or content management servers 102), and perform the neural network training processes.

In step 1007, each of the replacement candidate neural networks 635 generated in step 1001 and trained in steps 1002-1006 may be evaluated, and the most accurate neural network 635 may be selected as the replacement for the primary neural network 612. The evaluation process for the replacement candidates 625 may be similar to the initial evaluation process described above in step 704. For example, a random set of neural network training data may be designated as evaluation data and not used to train the replacement candidates 625 in step 1006. This evaluation data may include a portion of the initial training data used to train the primary neural network 612, along with a portion of the more recent training data received after the primary neural network 612 was deployed. The same evaluation data may be run through each of the trained replacement candidate neural networks 635, by providing the evaluation record inputs to the input nodes, and then comparing the neural network outputs to the corresponding evaluation record outputs. Each replacement candidate neural network 635 may then be evaluated based on its rate of successful predictions and/or its average degree of accuracy of predictions. The replacement candidate neural network 635 having the highest accuracy rate may be selected as the replacement for the primary neural network 612.

In step 1008, the primary neural network 612 may be replaced by the replacement candidate neural network 635 selected in step 1007. In some embodiments, the selected replacement neural network data structure 635 may be transmitted to the neural network management server 610 (or content management server 102) and designated as the new primary neural network 612. After deployment, requests from the CDN 100 for predictive analyses and decision-making processes will be routed to the new primary neural network 612. The old primary neural network as well as the non-selected replacement candidates 635 may be discarded and the corresponding memory and cloud resources may be de-allocated and returned to available computing resource pools.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A dynamically updating neural network system for evaluating and updating artificial neural networks for electronic learning systems, the dynamically updating neural network system comprising:
   a database server comprising one or more databases that:
      receive and store neural network training data corresponding to input and output data associated with an electronic learning system;
   a network interface configured to provide one or more electronic learning system servers with access to the database server via one or more computer networks; and
   a neural network management server of the electronic learning system comprising:
      a processing unit comprising one or more processors; and
      memory coupled with and readable by the processing unit and storing therein a set of instructions which, when executed by the processing unit, causes the neural network management server to:
         retrieve, from the database server and via the network interface, first neural network training data corresponding to input and output data of the electronic learning system;
         generate and train a first electronic learning system neural network using the first neural network training data;
         determine an error threshold associated with the trained first electronic learning system neural network;
         receive additional input data and corresponding output data associated with the electronic learning system;
         execute a plurality of predictive analyses using the first electronic learning system neural network, based on the additional input data associated with the electronic learning system;
         evaluate the first electronic learning system neural network by:
            comparing the results of each of the plurality of predictive analyses with the corresponding additional output data;
            aggregating the results of the plurality of predictive analyses to generate an aggregate error rate for the trained first electronic learning system neural network; and
            determining whether the aggregate error rate has exceeded the error threshold associated with the trained first electronic learning system neural network;
         in response to determining that the aggregate error rate has exceeded the error threshold associated with the trained first electronic learning system neural network, generate and train a plurality of additional electronic learning system neural networks using at least the first neural network training data and the additional input and output data associated with the electronic learning system;

evaluate the plurality of additional electronic learning system neural networks by executing one or more identical predictive analyses using each of the plurality of additional electronic learning system neural networks;

select a replacement electronic learning system neural network based on the evaluation of the plurality of additional electronic learning system neural networks; and replace the first electronic learning system neural network with the selected replacement electronic learning system neural network.

2. The dynamically updating neural network system of claim 1, wherein generating and training the plurality of additional electronic learning system neural networks comprises allocating a set of computing resources in a cloud computing architecture to generate and train the plurality of additional electronic learning system neural networks.

3. The dynamically updating neural network system of claim 1, wherein the memory of the neural network management server further stores instructions which, when executed by the processing unit, causes the neural network management server to:

execute a genetic mutation algorithm to determine a structural mutation for at least one of the plurality of additional electronic learning system neural networks.

4. The dynamically updating neural network system of claim 1, wherein generating the plurality of additional electronic learning system neural networks comprises:

executing a randomization algorithm to assign an initial random weight value to each of a plurality of node interconnections within each of the additional electronic learning system neural networks.

5. The dynamically updating neural network system of claim 1, wherein the error threshold associated with the trained first electronic learning system neural network is determined based at least in part on a cost or an availability of computing resources in a cloud computing architecture.

6. The dynamically updating neural network system of claim 1, wherein the memory of the neural network management server further stores instructions which, when executed by the processing unit, causes the neural network management server to:

update the first neural network training data to include the additional input and output data of the electronic learning system, wherein the additional input and output data of the electronic learning system is received after the generation and training of the first electronic learning system neural network.

7. A method of evaluating and updating artificial neural networks for electronic learning systems, the method comprising:

retrieving, from a database server via a network interface, first neural network training data corresponding to input and output data of an electronic learning system;

generating and training a first electronic learning system neural network using the first neural network training data;

determining an error threshold associated with the trained first electronic learning system neural network;

receiving additional input data and corresponding output data associated with the electronic learning system;

executing a plurality of predictive analyses using the first electronic learning system neural network, based on the additional input associated with the electronic learning system;

evaluating the first electronic learning system neural network by:

comparing the results of each of the plurality of predictive analyses with the corresponding additional output data;

aggregating the results of the plurality of predictive analyses to generate an aggregate error rate for the trained first electronic learning system neural network; and determining whether the aggregate error rate has exceeded the error threshold associated with the trained first electronic learning system neural network;

in response to determining that the aggregate error rate has exceeded the error threshold associated with the trained first electronic learning system neural network, generating and training a plurality of additional electronic learning system neural networks using at least the first neural network training data and the additional input and output data associated with the electronic learning system;

evaluating the plurality of additional electronic learning system neural networks by executing one or more identical predictive analyses using each of the plurality of additional electronic learning system neural networks;

selecting a replacement electronic learning system neural network based on the evaluation of the plurality of additional electronic learning system neural networks; and replacing the first electronic learning system neural network with the selected replacement electronic learning system neural network.

8. The method of claim 7, wherein generating and training the plurality of additional electronic learning system neural networks comprises allocating a set of computing resources in a cloud computing architecture to generate and train the plurality of additional electronic learning system neural networks.

9. The method of claim 7, further comprising:

executing a genetic mutation algorithm to determine a structural mutation for at least one of the plurality of additional electronic learning system neural networks.

10. The method of claim 7, wherein generating the plurality of additional electronic learning system neural networks comprises:

executing a randomization algorithm to assign an initial random weight value to each of a plurality of node interconnections within each of the additional electronic learning system neural networks.

11. The method of claim 7, wherein the error threshold associated with the trained first electronic learning system neural network is determined based at least in part on a cost or an availability of computing resources in a cloud computing architecture.

12. The method of claim 7, further comprising:

updating the first neural network training data to include the additional input and output data associated with the electronic learning system, wherein the additional input and output data associated with the electronic learning system is received after the generation and training of the first electronic learning system neural network.

13. A computer-program product tangibly embodied in a non-transitory machine-readable storage medium, including instructions configured to cause one or more data processors to perform actions including:
- retrieving, from a database server via a network interface, first neural network training data corresponding to input and output data of an electronic learning system;
- generating and training a first electronic learning system neural network using the first neural network training data;
- determining an error threshold associated with the trained first electronic learning system neural network;
- receiving additional input data and corresponding output data associated with the electronic learning system;
- executing a plurality of predictive analyses using the first electronic learning system neural network, based on the additional input associated with the electronic learning system;
- evaluating the first electronic learning system neural network by:
  - comparing the results of each of the plurality of predictive analyses with the corresponding additional output data;
  - aggregating the results of the plurality of predictive analyses to generate an aggregate error rate for the trained first electronic learning system neural network; and
  - determining whether the aggregate error rate has exceeded the error threshold associated with the trained first electronic learning system neural network;
- in response to determining that the aggregate error rate has exceeded the error threshold associated with the trained first electronic learning system neural network, generating and training a plurality of additional electronic learning system neural networks using at least the first neural network training data and the additional input and output data associated with the electronic learning system;
- evaluating the plurality of additional electronic learning system neural networks by executing one or more identical predictive analyses using each of the plurality of additional electronic learning system neural networks;
- selecting a replacement electronic learning system neural network based on the evaluation of the plurality of additional electronic learning system neural networks; and
- replacing the first electronic learning system neural network with the selected replacement electronic learning system neural network.

14. The computer-program product as recited in claim 13, wherein generating and training the plurality of additional electronic learning system neural networks comprises allocating a set of computing resources in a cloud computing architecture to generate and train the plurality of additional electronic learning system neural networks.

15. The computer-program product as recited in claim 13, wherein the actions further include:
- executing a genetic mutation algorithm to determine a structural mutation for at least one of the plurality of additional electronic learning system neural networks.

16. The computer-program product as recited in claim 13, wherein generating the plurality of additional electronic learning system neural networks comprises:
- executing a randomization algorithm to assign an initial random weight value to each of a plurality of node interconnections within each of the additional electronic learning system neural networks.

17. The computer-program product as recited in claim 13, wherein the error threshold associated with the trained first electronic learning system neural network is determined based at least in part on a cost or an availability of computing resources in a cloud computing architecture.

\* \* \* \* \*